United States Patent [19]

Kulkarni et al.

[11] Patent Number: 4,514,319

[45] Date of Patent: Apr. 30, 1985

[54] ANTIFOAM COMPOSITION CONTAINING HYDROCARBON-SILICON COPOLYMER, HYDROPHOBIC FILLER AND HYDROCARBON OIL

[75] Inventors: Ravi D. Kulkarni, Milpitas, Calif.; E. Desmond Goddard, Haworth, N.J.; Michael P. Aronson, Valley Cottage, N.Y.

[73] Assignee: Union Carbide Corporation, Danbury, Conn.

[21] Appl. No.: 478,718

[22] Filed: Mar. 25, 1983

[51] Int. Cl.³ .............................................. B01D 19/04
[52] U.S. Cl. .................................... 252/321; 252/358
[58] Field of Search ................................ 252/321, 358

[56] References Cited

U.S. PATENT DOCUMENTS

| | | |
|---|---|---|
| 3,076,768 | 2/1963 | Boylan . |
| 3,207,698 | 9/1965 | Liebling et al. . |
| 3,304,266 | 2/1967 | Sullivan . |
| 3,388,073 | 6/1968 | Domba . |
| 3,408,306 | 10/1968 | Boylan . |
| 3,691,091 | 9/1972 | Koerner . |
| 3,705,859 | 12/1972 | Boylan . |
| 3,714,068 | 1/1973 | Miller et al. . |
| 3,746,653 | 7/1973 | Churchfield . |
| 3,784,479 | 1/1974 | Keil . |
| 3,865,544 | 2/1975 | Keil . |
| 3,887,487 | 6/1975 | Camp et al. ......................... 252/358 |
| 3,909,445 | 9/1975 | Ernst . |
| 3,912,652 | 10/1975 | Colguhoun . |
| 3,959,176 | 5/1976 | Mahn et al. . |
| 4,225,456 | 9/1980 | Schmidt et al. ..................... 252/358 |
| 4,313,917 | 2/1982 | Ohta ..................................... 252/358 |
| 4,384,976 | 5/1983 | Grünert et al. ...................... 252/321 |

Primary Examiner—Ben R. Padgett
Assistant Examiner—Anne Brookes
Attorney, Agent, or Firm—P. W. Leuzzi

[57] ABSTRACT

Hydrocarbon oil based antifoams compositions containing a hydrocarbon-silicon copolymer, a hydrophobic filler, an organo-silicone surfactant, a hydrocarbon carrier oil and optionally a silicone oil act to effectively defoam concentrated solutions, including those containing ionic surfactants or protein based solutions. The use of the hydrocarbon oil based silicone antifoams represents an inexpensive route to defoams difficult solutions.

19 Claims, No Drawings

ANTIFOAM COMPOSITION CONTAINING HYDROCARBON-SILICON COPOLYMER, HYDROPHOBIC FILLER AND HYDROCARBON OIL

BACKGROUND

The present invention relates to a novel hydrocarbon oil based antifoam composition. Antifoams based on hydrocarbon oils, such as mineral oil, that contain dispersed hydrophobic solid particles are well known in the art. Although effective in easy-to-defoam solutions of high surface tension, their performance is much more variable in concentrated surfactant solutions particularly those containing ionic surfactants. This limitation arises, in part, from the intrinsically higher surface tension of hydrocarbon oils relative to other antifoam vehicles such as silicon oil. To overcome this problem, various compounds have been suggested to increase the rate or extent of spreading of the antifoam. These agents are generally low to intermediate hydrophilic-lyophilic balance (HLB) nonionic surfactants that are soluble or dispersible in hydrocarbon oil, such as disclosed in U.S. Pat. No. 3,076,768. However, their effect is often variable and their utility has been questioned, (see, for example, U.S. Pat. No. 3,207,698 and GB Pat. No. 1,166,877).

Because hydrocarbon oil, and particularly mineral oil, is a relatively inexpensive antifoam vehicle, it is desirable to develop a hydrocarbon oil based antifoam that is highly effective in difficult-to-defoam aqueous based surfactant or protein solutions.

It has now been found that certain clearly defined mixtures of specific hydrocarbonsilicone copolymers, organo-silicone surfactants and fillers such as silica are highly effective with hydrocarbon oil as antifoams for these difficult-to-defoam surfactant solutions. Furthermore, certain combinations have high antifoam performance in ionic foaming solutions while other are particularly suited to defoaming nonionic surfactant or protein based solutions.

The use of hydrophobic silica in hydrocarbon oil based antifoams is well known as disclosed in U.S. Pat. Nos. 3,076,768; 3,207,698; 3,388,073 and 3,714,068. U.S. Pat. Nos. 3,912,652 and 3,959,176 deal with the use of hydrophobic silica in polyoxyethylene and polyoxypropylene copolymers.

The use of hydrophilic silica that is activated, in situ, in a non-silicone oil based antifoam is disclosed in U.S. Pat. No. 3,304,266 for a water insoluble polyalkylene oxide and in G.B. Pat. No. 1,166,877 using an alkoxy silicone chloride as the hydrophobing agent.

The use of intrinsically hydrophobic fillers in organic liquids is well known. For example, Canadian Pat. No. 508,856 discloses N,N distearyl ethylene diamine in white spirits, while the use of finely divided polyolefin polymers or polyesters dispersed in organic liquids in disclosed in U.S. Pat. No. 3,705,859. A conventional organic surfactant is alleged to improve the performance of the latter composition. The use of fatty acid salts is disclosed in G.B. Pat. No. 1,267,482 while low molecular weight polyethylenes (500–25,000) in combination with mineral oil and conventional organic nonionic emulsifiers is disclosed in U.S. Pat. No. 3,909,445.

The use of surfactants to promote spreading and to improve the performance of hydrocarbon oil-silica antifoams is claimed in U.S. Pat. Nos. 3,076,768 and 3,408,306, but these surfactants are conventional organic surfactants or emulsifiers. The efficacy of such spreading agents is questioned in U.S. Pat. Nos. 3,207,698; and 3,714,068 and G.B. Pat. No. 1,166,877.

U.S. Pat. No. 3,691,091 describes the use of organo-silicone compounds to improve the performance of silicone oil-silica based antifoams. However, the organo-silicones are of a different type than that used in the present invention.

The use of silicone-glycol copolymers in association with silicone oil and silica is disclosed in various Dow Corning Patents: U.S. Pat. Nos. 3,746,653; 3,784,479 and 3,865,544. The concentrations claimed are 70–98.9 wt. %. The compositions of the present invention employ a hydrocarbon oil, such as mineral oil, as the vehicle and not a silicone oil.

None of the patents cited above mentions the use of hydrocarbon-silicone copolymers of the type disclosed herein, in combination with a hydrocarbon carrier oil and a hydrophobic filler. Nor do these patents describe the use of organo-silicone surfactants of the type found effective here, in hydrocarbon oil based antifoams.

SUMMARY OF THE INVENTION

The present invention provides a novel hydrocarbon oil based silicone antifoam composition which comprises (a) from 1 to 60 weight percent of a hydrocarbon-silicone copolymer; (b) from 1 to 20 weight percent of a hydrophobic filler having a particle size on the average of from 200 to 5,000 Å; (c) from 0 to 25 weight percent of an organo-silicone surfactant of the general formula

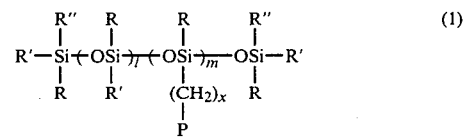

(1)

wherein R, R', and R" are individually alkyl groups having from 1 to 18 carbon atoms, inclusive, P is either a polyoxyethylene group, a polyoxypropylene group or a mixture thereof which can be terminated with either an alkyl or hydroxyl group and l and m are such that the surfactant is liquid, has limited solubility, and an HLB value of from 4 to 14; (d) from 20 to 97 weight percent of a hydrocarbon carrier oil; and (e) optionally from 0 to 20 weight percent of a silicone oil.

The present invention also provides a process for defoaming certain solutions employing the novel hydrocarbon oil based silicone antifoam composition. Of particular interest is the capacity for defoaming solutions containing ionic surfactants or protein based solutions.

DETAILED DESCRIPTION OF THE INVENTION

In accordance with the present invention there is provided a novel hydrocarbon oil based antifoam composition which comprises (a) a hydrocarbon-silicone copolymer; (b) finely divided hydrophobic filler particles; (c) an organo-silicone surfactant; (d) a hydrocarbon carrier oil; and (e) optionally a silicone oil.

As is well known in the art, effective liquid antifoams are those that can spread on the surface of a foaming solution. The criteria for spreaking is:

$$\gamma_F - \gamma_A - \gamma_{AF} > 0 \qquad (2)$$

where $\gamma F$ is the surface tension of the foaming solution, $\gamma A$ is the surface tension of the antifoam and $\gamma AF$ is the interfacial tension between the antifoam and the foaming solution. The role of the hydrocarbon-silicone copolymer is to reduce the surface tension of the hydrocarbon oil and thus by equation (1) increase is spreading ability. It has been found that hydrocarbon-silicone copolymers meeting the following requirements are particularly effective. First, they should dissolve in the hydrocarbon carrier oil so as to avoid segregation in this phase. Second, they should be sufficiently surface active at the oil/air interface to decrease the surface tension at a reasonably low concentration.

Ingredients that have been found particularly well suited to this application are hydrocarbon-silicone copolymers. Many useful hydrocarbon-silicone copolymers are known in the art which could be employed in the present invention. Although not intended to be strictly limited to any particular hydrocarbon-silicone copolymer, three generic classes of such copolymers are deemed particularly useful in this invention.

One class of copolymers that has been found to be particularly effective in the present application is the copolymer represented by the formula:

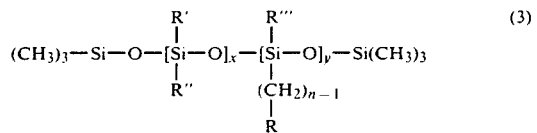

(3)

Wherein R is an alkyl, aryl, aralkyl or alkaryl group containing from six to thirty carbon atoms inclusive, preferably from six to eighteen; R', R" and R'" are individually selected from the group consisting of methyl, ethyl, propyl, hydrogen, hydroxy, and phenyl groups provided that no more than 5% of the total of R', R" and R'" groups are hydrogen, hydroxy, phenyl or a combination thereof, and the proportions of dialkylsiloxane (x) and alkylmethylsiloxane (y) groups in the polymer as well as the alkyl chain length are selected so as to meet the solubility-spreading criteria in a given hydrocarbon carrier oil. The value of n can vary so long as the % $CH_2$ content is as specified. With mineral oil, which is a highly preferred hydrocarbon carrier oil, it has been found that the specific values of x, y, n in equation (3) can be varied over very board limits provided that the % $CH_2$ content is in the range of about 30% to about 70%, preferably between 45% and 65%. When R is phenyl or alkaryl n can equal one. The % $CH_2$ content can be calculated in any of a number of ways but for illustration only, when R, R', R" and R'" are methyl the $$\% \ CH_2 = \frac{(n-1)y}{(n-1)y + 2(x+y) + 6} \times 100 \quad (4)$$

The art of making these compounds is well known and described as, for example, by W. Noll in "The Chemistry and Technology of Silicones", Academic Press, N.Y., 1968. Either random or block copolymers of this type can be utilized.

Other copolymers that have utility in the present antifoam are the non-hydrolyzable ABA block copolymers of the structure:

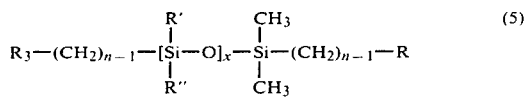

(5)

and the hydrolyzable ABA block copolymers of the structure:

(6)

Another class of copolymers that have demonstrated utility are the non-hydrolyzable ABz block copolymers of the structure:

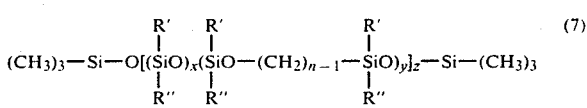

(7)

and the hydrolyzable ABz block copolymers of the structure:

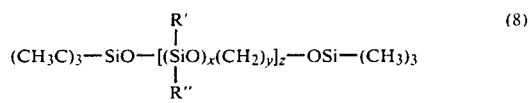

(8)

wherein R,R',R",x,y and n have the same significance as set forth above and z is an interger all chosen so as to meet the solubility and spreading criteria already set forth and a % $CH_2$ content within the required range.

The proportion of the copolymer used in the present antifoam composition can be between 1 to 60 percent by weight and preferably is between 5% and 20%.

The second component of the instant antifoam composition is a hydrophobic filler that is well dispersed in the hydrocarbon carrier oil.

The hydrophobic filler can be of any type of mineral that is conventionally employed in making antifoams, such as powdered alumina, titania, silica, pearlite or clay minerals, preferably silica, and more preferably a fumed or precipitated silica of an average particle size of 200 to 5,000 Å, that has been hydrophobized by pretreatment or by an insitu heating.

The surface of the inorganic solid can be rendered hydrophobic by various treatments before it is incorporated in the antifoam. Such treatments involve reacting the mineral with organic, silicone, or organo-silicone reagents having at least one of the following functional groups: —OH, —$NH_2$, —SH, —NHR, —$NR_2$, —$NR_3$ or —$NR_4$, which can interact with the organic filler surface. The —OH group can include the —Si—OH groups most often formed by hydrolysis of chlorosilanes. Typically used reagents include disilazanes or silanes having alkyl groups containing one to eight carbon atoms, such as hexamethyldisilazine, octadecyltrichlorosilane or trimethyl chlorosilane; primary, secondary, tertiary, or quaternary alkyl or alkylether amines having eight to eighteen carbon atoms in the alkyl group.

A typical process for making hydrophobic filler particles consists of tumbling the fine silica with the appropriate hydrophobizing agent and suitable amounts of a solvent. The product is then heated in an oven at a moderate temperature for two hours.

It has been found that the hydrophobization can also be accomplished by an in situ procedure similar to that used in making silicone oil antifoams. Here, a hydrophilic silica such as a fumed silica is incorporated and well dispersed, via high shear, into a solution of the hydrocarbon-silicone copolymer dissolved in a hydrocarbon carrier oil The mixture is then heated under moderate shear for about 2 hours to activate the surface. it has been found that the reaction temperature required for activation can be greatly reduced by incorporation in the reaction mixture of small quantities (0.1 to 1%) of a basic catalyst to facilitate the reaction of silica with a polydimethylsiloxane. Many examples of such basic catalysts are disclosed in U.S. Pat. No. 3,560,401, and include, by way of example, the alkali and alkaline earth hydroxides. The preferred basic catalysts are the alkali metal silanolates.

Another class of potentially suitable fillers for the present application is made up of naturally or intrinsically hydrophobic solids that are known to be effective antifoam fillers. Examples of such materials are polyolefin polymers (U.S. Pat. No. 3,705,859); thermoplastic polyesters (U.S. Pat. No. 3,705,859); polyvalent metal salts of alkyl carboxylic acids (G.B. Pat. No. 1,267,482); amides of long chain fatty acids and mono and polyamines (Canadian Pat. Nos. 922,456; 926,261; 943,035); long chain fatty alcohols (G.B. Pat. No. 1,386,042) and low molecular weight polyethylenes (U.S. Pat. No. 3,909,445).

The hydrophobic filler particles can be present in the antifoam composition at a total level of between 1 and 20 weight percent preferably between 2.5 and 7%. The filler can be a single species or can be a mixture of several different types.

The organo-silicone surfactant has several functions in the antifoam composition. First, it improves the spreading power of the antifoam over the bubble surface and in this way effectively distributes the antifoam. A second important function of the silicone surfactant is to reduce the adsorption of an ionic surfactant on the surface of the antifoam droplet and thus minimize the electrical repulsive forces that inhibit the transport of antifoam to the bubble surface. An additional function of the organo-silicone surfactant found in the present study is to facilitate the emulsification of the antifoam compositions.

Preferred organo-silicone surfactants are those having the following structure.

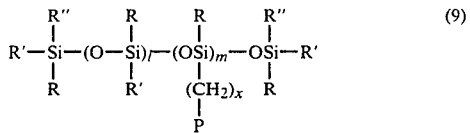

where R, R' and R'' are individually alkyl groups having from one to eighteen carbon atoms or hydrogen, hydroxy or phenyl groups provided that total of such R,R' and R'' does not exceed 5%. Preferably they are methyl groups. P is a polyalkoxy group having from 2 to 4 carbon atoms, such as polyoxyethylene, polyoxypropylene, or a mixture thereof, and can be terminated by either an alkyl or hydroxyl group. l and m are chosen so that the resulting surfactant is liquid, has limited solubility in both the aqueous foaming solution and antifoam oil phase and has an HLB in the range of 4–14, preferably 8–11. And x has a value of from two to five.

Typical examples of such surfactants are:

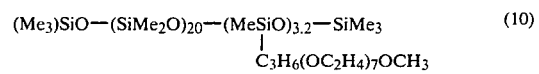

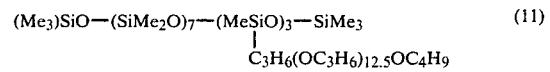

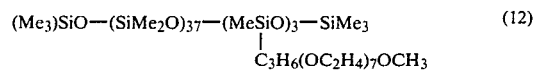

Techniques for making such organo-silicone surfactants are disclosed in numerous patents and publications such as, for example, in U.S. Pat. Nos. 2,834,748; 2,917,480; 3,398,104; 3,402,192; 3,507,815 and 3,741,917.

The proportions of silicone surfactant in the antifoam composition ranges between 0 and 25 weight percent, preferably between 0.5 and 10% and most preferably between 0.5 and 3%. It has been found that the organo-silicone surfactant is a very important ingredient when the antifoam composition is designed for foaming solutions containing ionic surfactants. However, in certain less demanding antifoam applications the silicone surfactant may not be required. This is why the 0% level has been included in the preferred range.

Another component of the instant antifoam composition is an hydrocarbon carrier oil that makes up the balance of the composition, except for when a silicone oil is also employed. Generally, this proportion ranged from between 20 to 98 weight percent.

Any of a broad number of water immiscible hydrocarbon oils can function as the carrier oil. These include, but are not limited to, the following types of oils: normal liquid hydrocarbons such as tetradecane or hexadecane; branched paraffins such as isooctane; complex saturated hydrocarbon liquids composed of paraffinic and naphthenic molecules commonly known as mineral oils or liquid paraffins; complex products of the distillation of petroleum having boiling points greater than 140° C. such as kerosene, heating oils or mineral spirits; triglyceride oils such as trioleins; vegetable oils such as palm oil or olive oil and the like; and alkyl benzenes or other alkyl aryl compounds.

It has been found, however, that mineral oils are particularly well suited to serve as hydrocarbon carrier oils because of their relative inertness and compatibility within the range of components described above. Furthermore, it has been found that mineral oils having viscosities between 15 and 70 cST, preferably 25 to 60 cST, (at the temperatures for which they are used as antifoams) produce highly effective antifoams and are thus preferred carrier oils. It should be noted that in some instances the hydrocarbon oil can be partially (up to 25%) replaced by an oil soluble viscosity additive, such as polyisobutylene.

The antifoam composition may optionally contain from about 0 to 20 weight percent of a silicone oil. The use of any silicone oil known in the antifoam art is considered within the scope of the invention. Such oils include the polyorganosiloxane with a viscosity in the range of about 5 to 100,000 centistokes measured at 25° C. as taught in U.S. Pat. No. 4,076,648.

The antifoam compositions consisting of the components described above can be prepared in any manner suitable and are generally prepared by the following sequence:

(a) The hydrocarbon-silicone copolymer (i) and hydrocarbon carrier oil are combined and mixed in the proportions described above.

(b) The hydrophobic filler is thereafter blended into the above mixture (a) and is then dispersed. This dispersion step depends on the type of filler used. For example, if the filler is a pre-hydrophobized material such as silica, low shear mixing is sufficient for incorporation. However, if in-situ hydrophobization is employed, a higher shear and heat treatment is required (activation). For this case, incorporation of a catalyst is desirable as discussed above. In other cases that employ intrinsically hydrophobic fillers a crystallization step may be desirable to achieve the optimal particle size.

(c) The organo-silicone surfactant if desired, is then blended into the above mixture (b).

The antifoam composition prepared in steps (a) to (c) can be used neat, i.e., as 100% active. Alternatively, it can be emulsified in water by any of the well emulsification techniques. Suitable emulsifiers for this purpose are: polyoxyethylene alcohols; sorbitan or glycerol fatty acid esters; polyoxyethylene fatty acid esters; and mixtures of the same. Additionally, the antifoam composition of the present invention may be blended with other known antifoam composition already commercially available.

The final emulsion contains 1-50% of the active antifoam compound and can also contain suitable stabilizers as are often used with such emulsions.

The antifoams so prepared, following the teachings disclosed herein, have been found to be highly effective and superior to several commercial antifoams.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

ANTIFOAM PERFORMANCE

Antifoam performance was tested by a nitrogen bubbling technique. In this procedure, nitrogen is sparged via glass frit through a surfactant solution contained in a 1 liter graduated cylinder. The volume of foam generated is found to be a reasonably linear function of sparging time, i.e., $$V_f = Kt \tag{13}$$

where $V_f$ is the foam volume, t is the time and K is a constant dependent on the flow rate and foaming solution.

The antifoam efficiency is defined as the rate of increase in foam volume of a given surfactant solution relative to a solution that contains a given concentration of antifoam.

Thus, antifoam efficiency $= K_O/K$, where K and $K_O$ are the foaming rates in the presence and absence of antifoam, respectively. An antifoam efficiency equal to 10 indicates that a ten-fold increase in the time required to generate a given volume of foam has been produced by the presence of the antifoam. An antifoam efficiency equal to 1 indicates the absence of any antifoam activity. For this technique to be meaningful, the rate of bubble production must be well controlled. Not only must the gas flow rate be controlled but also attention must be paid to the cleanliness of the glassware particularly the glass frit. It is important to clean the frit thoroughly before each run. For this purpose an alcoholic KOH solution followed by chromic acid and finally rinsing well with distilled water is satisfactory.

COMPONENTS

Surfactant solutions that were used in the present evaluations are listed in Table 1. They represent models of high foaming anionic (SDS), nonionic (15-S-9) and protein based (FF) foamants. These solutions were freshly prepared before each determination of antifoam performance.

TABLE 1

| Test Solution | Active Foamant | Supplier |
|---|---|---|
| 0.5% SDS | Sodium dodecyl sulfate (98 + % purity) | E.M. Laboratories, Inc. |
| 0.5% 15-S-9 | TERGITOL 15-S-9, secondary alcohol ethoxylate | Union Carbide Corp. |
| 10% FF | Protein based fire fighting foam | National Foam Systems, Inc. |

Table 2 illustrates the convention that will be used to identify either random or block hydrocarbon silicone copolymers throughout the following examples.

TABLE 2

| Copolymers Type | Abbreviation | Identity |
|---|---|---|
| Random hydrocarbon-silicone copolymer | $MD_xD'_yM(R)$ | $M = (CH_3)_3-O$ <br> $D = (CH_3)_2-O$ <br> $D' = (CH_3)Si-O$ <br> $\phantom{D'=(CH_3)S}|$ <br> $\phantom{D'=(CH_3)Si-O}R$ |
| ABA Block Copolymers $RD''_xR$ | | $D'' = (CH_3)_2-Si-O$ |

EXAMPLES

Table 3 illustrates the reduction in surface tension that is achieved by dissolving a typical hydrocarbon-silicone copolymer in mineral oil. The mineral oil of this example is sold by Atlantic Ridgefield under the tradename Arcoprime 200. A marked reduction in surface tension is evident at a fairly low copolymer concentration.

TABLE 3

| Wt. % Hydrocarbon-Silicone Copolymer[a] | Surface Tension, (dyne cm$^{-1}$) |
|---|---|
| 0 | 31.0 |
| 1.0 | 25.8 |
| 5.0 | 25.7 |
| 10.0 | 24.8 |
| 20.0 | 24.0 |
| 100.0 | 22.4 |

[a] $MD_{100}D'_{17}M (C_{18}H_{37})$

EXAMPLE 1

This example illustrates the importance of the key ingredients described in the previous section. Antifoams AF1–AF6 whose compositions are set forth in Table 4 were prepared in the following manner. The desired parts of mineral oil (Arcoprime 200) and hydrocarbon silicone copolymer were combined and mixed for 10 minutes at speed #2 using a Hobart laboratory mixer (Model N-50). Hydrophobic silica (Tullenox 500 from Tulco Corporation) was added and the mixture stirred for 15 minutes (speed #2). Finally, the desired amount of an organosilicone surfactant was added and the dispersion was blended for 10 minutes at Speed #2. The resulting antifoam was an opaque uniform viscous liquid.

The performance of antifoams AF1–AF6 was tested by the Antifoam Performance methods set forth above using a 0.5% sodium dodecyl sulfate (SDS) solution which is a well known example of an anionic surfactant that has a high foaming capacity and which is difficult to defoam. The results of these tests are recorded in Table 5. It is seen that only those antifoams containing the key ingredients described in the previous section, i.e., hydrocarbon-silicone copolymer, hydrophobic filler, organo-silicone surfactant and hydrocarbon oil, have high antifoaming activity. It is also observed that the preferred combinations display a very high degree of synergism that could not be predicted from a knowledge of the individual ingredients. In general, 3-component systems and 2-component systems (e.g., mineral oil plus hydrophobic filler and/or silicone surfactant) other than those already exemplified have poor antifoaming activity.

TABLE 4

| Antifoam Designation | Hydrocarbon[a] Silicone Copolymer wt % | Hydrophobic[b] Filler Wt % | Organo Silicone[c] Surfactant wt % | Mineral Oil[d] Wt. % |
|---|---|---|---|---|
| AF1 | 0 | 6.0 | 0 | 94.0 |
| AF2 | 0 | 6.0 | 2.5 | 91.5 |
| AF3 | 20 | 0 | 0 | 80 |
| AF4 | 20 | 0 | 2.5 | 77.5 |
| AF5 | 20 | 6.0 | 1.0 | 73.0 |
| AF6 | 20 | 6.0 | 2.5 | 71.5 |

[a]$MD_{100}D'_{17.5}M(C_{18}H_{37})$
[b]Tullenox 500 - a hydrophobic silica
[c]$(Me)_3SiO-(SiMe_2O)_{20}-(MeSiO)_{3.2}-Si(Me)_3C_3H_6(OC_2H_4)_7OCH_3$
[d]Arcoprime 200 - a mineral oil

TABLE 5

| Antifoam[a] Designation | Antifoam Performance, at 500 ppm Antifoam Conc. in 0.5% SDS |
|---|---|
| AF1 | 1.1 |
| AF2 | 1.2 |
| AF3 | 1.0 |
| AF4 | 1.0 |
| AF5 | 26 |
| AF6 | 407 |

[a]See Table 4 for compositions.

EXAMPLE 2

This example demonstrates the importance of selecting a hydrocarbon-silicone copolymer that is both soluble in the hydrocarbon oil carrier and at the same time is surface active so as to allow the antifoam oil to spread on the foaming solution. A series of antifoam compounds was prepared following the methods of Example 1. All the preparations contained 6% Tullenox silica, 2.5% of an organo-silicone surfactant used in Example 1 (see Table 4), 71.5% Arcoprime 200 mineral oil and 20% of various hydrocarbon-silicone random copolymers of the type described in Table 2. The hydrocarbon-silicone copolymers are identified in Table 6 along with their solubility in mineral oil (at 20%) and the ability of the copolymer-mineral oil solution to spread on 0.5% SDS. The antifoam performance of these compositions was tested by the Antifoam Performance methods set forth above. The results are shown in Table 6. Hydrocarbon-silicone copolymers that are both soluble and cause spreading on the SDS solution have much higher performance than copolymers that do not simultaneously satisfy these requirements. The active compositions of Table 6 would also be expected to be effected against other types of foams, e.g. those from proteins and nonionic surfactants. Furthermore, Table 6 demonstrates that a broad range of copolymers are useful. For example, copolymers having pendant alkyl groups between 8 and 22 carbon atoms and with 50 to 200 dimethyl siloxane units all function well provided that the $CH_2$ content defined by Equation 4 is between about 45 and 75%. Logically, it can be expected that copolymers outside of this molecular weight range will also function well so long as their $CH_2$ content falls within the afore-specified percentage range. It appears that the viscosity of the copolymer is not of prime importance since some of the most effective copolymer are highly viscous while others are low viscosity liquids.

TABLE 6

| Antifoam[a] | Hydrocarbon-Silicone, Copolymer | % $CH_2$ | Soluble in Mineral Oil at 20% (25° C.) | Spreads on 0.5% SDS at 25° C. | Antifoam Performance at 500 ppm in 0.5% SDS, |
|---|---|---|---|---|---|
| AF7 | $MD_{37}D'_3M(C_8H_{17})$ | 14.3 | No | Yes | 1.3 |
| AF8 | $MD_{228}D'_{12}M(C_8H_{17})$ | 14.7 | No | Yes | 1.2 |
| AF9 | $MD_{57}D'_3M(C_{18}H_{37})$ | 28.8 | No | Yes | 3.7 |
| AF10 | $MD_{228}D'_{12}M(C_{18}H_{37})$ | 29.6 | No | Yes | 2.1 |
| AF11 | $MD_{108}D'_{12}M(C_{12}H_{25})$ | 34.9 | No | Yes | 2.8 |
| AF12 | $MD_{57}D'_{12}M(C_8H_{17})$ | 36.8 | No | Yes | 3.4 |
| AF13 | $MD_{192}D'_{48}M(C_8H_{17})$ | 40.9 | No | Yes | 1.8 |
| AF14 | $MD_{75}D'_{13.5}M(C_{12}H_{25})$ | 44.8 | Yes | Yes | 69 |
| AF15 | $MD_{100}D'_{11}M(C_{18}H_{37})$ | 45.0 | Yes | Yes | 176 |
| AF16 | $MD_{100}D'_{42}M(C_8H_{17})$ | 50.3 | Yes | Yes | 105 |
| AF17 | $MD_{100}D'_{13.5}M(C_{22}H_{45})$ | 54.9 | Yes | Yes | 237 |
| AF18 | $MD_{100}D'_{17.5}M(C_{18}H_{37})$ | 55.2 | Yes | Yes | 407 |
| AF19 | $MD_{57}D'_{12}M(C_{18}H_{37})$ | 58.6 | Yes | Yes | 67 |
| AF20 | $MD_{192}D'_{48}M(C_{18}H_{37})$ | 62.7 | Yes | Yes | 316 |

TABLE 6-continued

| Antifoam[a] | Hydrocarbon-Silicone. Copolymer | % CH$_2$ | Soluble in Mineral Oil at 20% (25° C.) | Spreads on 0.5% SDS at 25° C. | Antifoam Performance at 500 ppm in 0.5% SDS. |
|---|---|---|---|---|---|
| AF21 | MD$_{40}$D'$_{40}$M(C$_{18}$H$_{37}$) | 80.4 | Yes | No | 1.4 |

[a]Each antifoam contains:
2.5% Organo-Silicone Surfactant (Example 2)
6.0% Tullenox 500 Silica
20% Hydrocarbon-Silicone Copolymer
71.5% Arcoprime 200

EXAMPLE 3

The results in Table 7 demonstrate that quite different organo-silicone surfactants can function in the present antifoam compositions provided their HLB (measured by techniques well known in the art) falls in the range disclosed above, namely 4–14 and preferably 8–11. Thus antifoams AF 22 and AF 23 were prepared with the organo-silicone surfactants set forth in Table 7, by the procedure described in Table 2. As seen in Table 7, these compositions have high antifoam performance despite the highly different structures of the two surfactants. A composition without either of the organo-silicone surfactants has a performance of 1.0 indicating a lack of antifoam activity in 0.5% SDS.

TABLE 7

| Antifoam[a] | Organo-Silicone Surfactant | HLB | Antifoam Performance at 500 ppm in 0.5% SDS |
|---|---|---|---|
| AF 22 | Me$_3$SiO(SiMe$_2$O)$_{20}$(MeSiO)$_{3.2}$—SiMe$_3$<br>　　　　　　　　　　　　|<br>　　　　　　　　　C$_3$H$_6$(OC$_2$H$_4$)$_7$OCH$_3$ | 10.5 | 407 |
| AF 23 | Me$_3$SiO(SiMe$_2$—O)$_7$(MeSiO)$_3$—SiMe$_3$<br>　　　　　　　　　　　　|<br>　　　　　　　　　C$_3$H$_6$(OC$_3$H$_6$)$_{13.5}$OC$_4$H$_9$ | 10.5 | 407 |

[a]The antifoam composition consists of:
2.5% Organo-silicone copolymer (above)
4.5% Tullenox 500 silica
20% MD$_{100}$D'$_{17.5}$M(C$_{18}$H$_{39}$)
73% Arcoprime 200 mineral oil

EXAMPLE 4

This example illustrates the use of an alternative hydrocarbon-silicone copolymer of the ABA type. An antifoam composition, AF24, was prepared by the method of EXAMPLE 1 that contained 20% of an ABA copolymer of the formula:

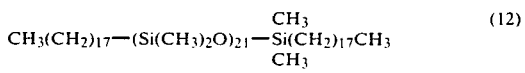

$$CH_3(CH_2)_{17}-(Si(CH_3)_2O)_{21}-Si(CH_2)_{17}CH_3 \quad (12)$$

6% Tullenox 500 silica, 2.5% of an organo-silicone surfactant as used in Example 1 (see Table 4) and 71.5% Arcoprime 200 mineral oil. When tested in 0.5% SDS at a 500 ppm level this antifoam had an efficiency of 2.9. A similar composition without the ABA copolymer had an efficiency of 1.1. Although this particular ABA copolymer is not as effective as many of the random copolymers described in previous examples it did significantly improve the antifoam activity of the base formulation.

EXAMPLE 5

As discussed in the description of the invention other fillers besides pre-hydrophobized silica can be used in our antifoam compositions. A filler that is particularly convenient is hydrophilic silica that is activated in the composition by a heat treatment step. By way of illustration antifoams AF25–AF31 whose compositions are set forth in Table 8 were prepared as follows: The hydrocarbon-silicon copolymer was first dissolved in mineral oil (Arcoprime 200). Cabosil HS-5 (Cabot Corporation), a typical hydrophilic silica, was dispersed in this solution with the aid of a high shear Cowles mixer. Potassium silanolate was then added and the dispersion was transferred to a 250 ml, 3 neck flask fitted with a thermal regulator, condenser and stirrer. The mixture was heated at 150° C. for 2 hours under constant stirring. It was observed that a large drop in viscosity took place after the heat treatment step. If desired, an organo-silicone surfactant can be added to the antifoam compound after the heat treatment step.

The antifoam performance of compositions AF2-5–AF31 was measured in several foaming solutions by the Antifoam Performance method set forth above and the results are recorded in Table 9. It is clear from the results that antifoams compounded with hydrophilic silica are particularly effective in protein (in this case fire fighting foam) based and nonionic surfactant solutions.

It has been found that lower compounding temperatures, e.g., 75° C., can be employed provided that the potassium silanolate catalyst is used.

TABLE 8

| Antifoam[a] Designation | Hydrocarbon-Silicone Copolymer | Wt % | Cabosil H55 Wt % | Organo-Silicone Surfactant Wt % | Mineral[c] Oil Wt % |
|---|---|---|---|---|---|
| AF 25 | — | — | 4.5 | — | 95.5 |
| AF 26 | MD$_{100}$D'$_{17.5}$M(C$_{18}$H$_{39}$) | 20.0 | 4.5 | — | 75.5 |

TABLE 8-continued

| Antifoam[a] Designation | Hydrocarbon-Silicone Copolymer | Wt % | Cabosil H55 Wt % | Organo-Silicone Surfactant Wt % | Mineral[c] Oil Wt % |
|---|---|---|---|---|---|
| AF 27 | $MD_{100}D'_{17.5}M(C_{18}H_{39})$ | 20.0 | 4.5 | 2.5 | 72.0 |
| AF 28 | $MD_{100}D'_{13.5}M(C_{22}H_{47})$ | 20.0 | 4.5 | — | 75.5 |
| AF 29 | $MD_{100}D'_{13.5}M(C_{22}H_{47})$ | 20.0 | 4.5 | 2.5 | 72.0 |
| AF 30 | $MD_{100}D'_{42}M(C_8H_{19})$ | 20.0 | 4.5 | — | 75.5 |
| AF 31 | $MD_{100}D'_{42}M(C_8H_{19})$ | 20.0 | 4.5 | 2.5 | 72.0 |

[a] All formulations were heat treated at 150° C. for 2 hrs and contain potassium Silanolate Catalyst.
[b] The organo silicone surfactant was the same as used in Example 4 (Table 4).
[c] Arcoprime 200 mineral oil.

TABLE 9

| Antifoam[a] Designation | Antifoam Efficiency, 0.5% SDS | in 0.5% 15-S-9[b] | at 500 PPM 10% FFF[c] |
|---|---|---|---|
| AF 25 | 1.0 | 1.0 | 1.0 |
| AF 26 | 1.8 | 66 | 3.0 |
| AF 27 | 4.0 | 75 | 9.0 |
| AF 28 | 1.6 | 284.0 | 15 |
| AF 29 | 11.0 | 264 | 25 |
| AF 30 | — | 144 | — |
| AF 31 | 1.9 | 167 | — |

[a] See Table 8 for composition.
[b] Tergitol 15-5-9, a nonionic surfactant of Union Carbide
[c] Fire Fighting Foam

EXAMPLE 6

Another useful filler is polyethylene wax, which is an example of an intrinsically hydrophobic solid. A 5.0 gm quantity of a low molecular weight polyethylene having a melting point of 110° C. (from Allied Chemicals) was dispersed in a mixture consisting of 80.0 gm Arcoprime 200, 5.0 gm of the copolymer $MD_{100}D_{17.5}M$ ($C_{18}H_{39}$) and 10.0 gm of a nonionic surfactant prepared by reacting nonyl-phenol with 4 moles of ethylene oxide. The dispersion was heated to 125° C. to form a homogeneous mixture. Slow cooling to room temperature yielded a fine particle dispersion of polyethylene. The resulting composition had significant antifoam activity when tested either in 0.5% TERGITOL 15-S-9 and 10% fire fighting foam.

EXAMPLE 7

The influence of the viscosity of the hydrocarbon carrier oil on antifoam performance is shown in Table 10 for compositions employing prehydrophobized silica and in Table 11 for antifoams where hydrophilic silica was used. Optimal performance is achieved when the viscosity of the carrier oil is between 16 and 75 cSt at the temperature the antifoam is used. However, good performance can be expected well outside of this viscosity range.

TABLE 10

| Antifoam[a] Designation | Hydrocarbon oil, | Viscosity cST at 100° F. | Antifoam Efficiency, in 0.5% SDS at 500 PPM |
|---|---|---|---|
| AF 32 | Hexadecane | 2.8 | 1.8 |
| AF 33 | Arcoprime 70[b] | 12.7 | 26 |
| AF 34 | Arcoprime 90[b] | 16.7 | 45 |
| AF 35 | Arcoprime 200[b] | 43.4 | 680 |

TABLE 10-continued

| Antifoam[a] Designation | Hydrocarbon oil, | Viscosity cST at 100° F. | Antifoam Efficiency, in 0.5% SDS at 500 PPM |
|---|---|---|---|
| AF 36 | Arcoprime 350[b] | 75.9 | 229 |

[a] Composition:
20% $MD_{100}D'_{17.5}M(C_{18}H_{37})$
6% Tullenox 500
2.5% Organo-Silicone Surfactant from Example 4
71.5% Hydrocarbon oil carrier
[b] Mineral oils - from Atlantic Ridgefield

TABLE 11

| Antifoam[a] Designation | Hydrocarbon oil, | Viscosity cST at 100° F. | Antifoam Efficiency, in 0.5% SDS at 500 PPM |
|---|---|---|---|
| AF 37 | Hexadecane | 2.8 | 4.2 |
| AF 38 | Arcoprime 70[b] | 12.7 | 12 |
| AF 39 | Arcoprime 90[b] | 16.7 | 66 |
| AF 40 | Arcoprime 200[b] | 43.4 | 144 |
| AF 41 | Arcoprime 350[b] | 75.9 | 4.2 |

[a] Composition:
20% $MD_{100}D'_{42}M(C_8H_{17})$
4.0% Cabosil HS5 hydrophillic silica
75.5% Hydrocarbon oil
all formulations heat treated at 150° C. for 2 hrs and containing a potassium silanolate catalyst.
[b] Mineral oils from Atlantic Ridgefield.

EXAMPLE 8

Various antifoam compositions, AF42–AF69, identified in Table 12 were prepared by procedures described in Example 1 (AF42–AF64) and Example 5 (AF65–AF69). These compositions were emulsified in water by standard techniques using a mixture of Span 60 and Myrj 52S emulsifiers (From ICI America): 20% emulsions were prepared. The performance of these emulsions at 200 ppm (as active) level was tested by the Antifoam Performance method set forth above and the results are collected in Table 13. It is seen that there are optimal levels of the silicone surfactant and hydrocarbon-silicone copolymer of Ca. 2.5% and 20% respectively. As was found in Table 3 with the neat antifoam compound, superior antifoaming ability is reached with soluble hydrocarbon-silicone copolymers. It is noted that effective antifoam emulsions could be prepared with a range of copolymers. Finally, we note that prehydrophobized silica favors high performance in anionic surfactant solutions while hydrophilic silica activated in situ yield effective antifoams for nonionic surfactants and protein based foaming solutions.

TABLE 12

| Antifoam Compound | Hydrocarbon-Silicone, Copolymer | Wt % | Organo-Silicone Surfactant[a] | Wt % | Filler[b] | Wt % | Arcoprime 200 Wt % |
|---|---|---|---|---|---|---|---|
| AF 42 | — | — | — | — | Tullenox 500 | 6.0 | 94 |
| AF 43 | — | — | Surfactant A (See Below) | 2.5 | Tullenox 500 | 6.0 | 91.5 |
| AF 44 | $MD_{75}D'_{13}M(C_{18}H_{37})$ | 20 | — | — | Tullenox 500 | 6.0 | 74 |
| AF 45 | $MD_{75}D'_{13}M(C_{18}H_{37})$ | 20 | Surfactant A | 2.5 | Tullenox 500 | 6.0 | 71.5 |

TABLE 12-continued

| Antifoam Compound | Hydrocarbon-Silicone, Copolymer | Wt % | Organo-Silicone Surfactant[a] | Wt % | Filler[b] | Wt % | Arcoprime 200 Wt % |
|---|---|---|---|---|---|---|---|
| AF 46 | $MD_{75}D'_{13}M(C_{18}H_{37})$ | 20 | Surfactant A | 5.0 | Tullenox 500 | 6.0 | 69 |
| AF 47 | $MD_{75}D'_{13}M(C_{18}H_{37})$ | 20 | Surfactant A | 10.0 | Tullenox 500 | 6.0 | 64 |
| AF 48 | $MD_{75}D'_{13}M(C_{18}H_{37})$ | 5 | Surfactant A | 2.5 | Tullenox 500 | 6.0 | 86.5 |
| AF 49 | $MD_{75}D'_{13}M(C_{18}H_{37})$ | 20 | Surfactant A | 2.5 | Tullenox 500 | 6.0 | 71.5 |
| AF 50 | $MD_{75}D'_{13}M(C_{18}H_{37})$ | 40 | Surfactant A | 2.5 | Tullenox 500 | 6.0 | 41.5 |
| AF 51 | $MD_{57}D'_3M(C_{18}H_{37})$ | 20 | Surfactant A | 2.5 | Tullenox 500 | 6.0 | 71.5 |
| AF 52 | $MD_{57}D'_3M(C_{18}H_{37})$ | 20 | Surfactant A | 2.5 | Tullenox 500 | 6.0 | 71.5 |
| AF 53 | $MD_{228}D'_{12}M(C_{18}H_{37})$ | 20 | Surfactant A | 2.5 | Tullenox 500 | 6.0 | 71.5 |
| AF 54 | $MD_{108}D'_{12}M(C_{12}H_{25})$ | 20 | Surfactant A | 2.5 | Tullenox 500 | 6.0 | 71.5 |
| AF 55 | $MD_{192}D'_8M(C_8H_{17})$ | 20 | Surfactant A | 2.5 | Tullenox 500 | 6.0 | 71.5 |
| AF 56 | $MD_{75}D'_{13.5}M(C_{12}H_{25})$ | 20 | Surfactant A | 2.5 | Tullenox 500 | 6.0 | 71.5 |
| AF 57 | $MD_{100}D'_{42}M(C_8H_{17})$ | 20 | Surfactant A | 2.5 | Tullenox 500 | 6.0 | 71.5 |
| AF 58 | $MD_{123}D'_{19.5}M(C_{18}H_{37})$ | 20 | Surfactant A | 2.5 | Tullenox 500 | 6.0 | 71.5 |
| AF 59 | $MD_{100}D'_{13.5}M(C_{22}H_{45})$ | 20 | Surfactant A | 2.5 | Tullenox 500 | 6.0 | 71.5 |
| AF 60 | $MD_{100}D'_{17.5}M(C_{18}H_{37})$ | 20 | Surfactant A (See Below) | 2.5 | Tullenox 500 | 6.0 | 71.5 |
| AF 61 | $MD_{100}D'_{48}M(C_{18}H_{37})$ | 20 | Surfactant A | 2.5 | Tullenox 500 | 6.0 | 71.5 |
| AF 62 | $MD_{100}D'_{13.5}M(C_{22}H_{45})$ | 20 | Surfactant A | 2.5 | Tullenox 500 | 6.0 | 71.5 |
| AF 63 | $MD_{57}D'_{12}M(C_{18}H_{37})$ | 20 | Surfactant A | 2.5 | Tullenox 500 | 6.0 | 71.5 |
| AF 64 | $MD_{57}D'_{12}M(C_{18}H_{37})$ | 20 | Surfactant A | 2.5 | Tullenox 500 | 6.0 | 71.5 |
| AF 65 | $MD_{123}D'_{19.7}M(C_{18}H_{37})$ | 20 | Surfactant A | 2.5 | Cabosil HS5 | 4.5 | 72 |
| AF 66 | $MD_{57}D'_{12}M(C_{18}H_{37})$ | 20 | Surfactant A | 2.5 | Cabosil HS5 | 4.5 | 72 |
| AF 67 | $MD_{100}D'_{17.5}M(C_{18}H_{37})$ | 20 | — | — | Cabosil HS5 | 4.5 | 74.5 |
| AF 68 | $MD_{100}D'_{42}M(C_8H_{17})$ | 20 | — | — | CabosilHS5 | 4.5 | 74.5 |
| AF 69 | $MD_{100}D'_{13.5}M(C_{22}H_{45})$ | 20 | — | — | Cabosil HS5 | 4.5 | 74.5 |

[a]Surfactant A is $Me_3SiO(SiOMe_2O)_{20}(MeSiO)_2$—$SiMe_3$
$\quad\quad\quad\quad\quad\quad\quad\quad\quad\quad\quad\quad\quad\quad |$
$\quad\quad\quad\quad\quad\quad\quad\quad\quad\quad\quad\quad\quad\quad C_3H_6(OC_2H_4)_7OCH_3$ Surfactant B is $Me_3SiO(SiOMe_2O)_{71}(MeSiO)_3$—$SiMe_3$
$\quad\quad\quad\quad\quad\quad\quad\quad\quad\quad\quad\quad\quad\quad |$
$\quad\quad\quad\quad\quad\quad\quad\quad\quad\quad\quad\quad\quad\quad C_3H_6(OC_3H_6)_{12.5}OC_4H_9$

[b]All Cabosil formulations contain 1% potassium silanolate catalyst and are heat treated 2 hrs at 150° C.

TABLE 13

| Antifoam Emulsion | Antifoam Compound (From Table 12) | Antifoam Efficiency, at 200 ppm (active) | | |
|---|---|---|---|---|
| | | 0.5% SDS | 0.5% 15-S-9 | 10% FF |
| E1 | AF 42 | 1.0 | 1.3 | 1.4 |
| E2 | AF 43 | 1.1 | 1.8 | 2.6 |
| E3 | AF 44 | 1.2 | — | 2.7 |
| E4 | AF 45 | 147 | — | — |
| E5 | AF 46 | 26 | — | — |
| E6 | AF 47 | 3.1 | — | — |
| E7 | AF 48 | 43 | — | — |
| E8 | AF 49 | 147 | — | — |
| E9 | AF 50 | 15 | — | — |
| E10 | AF 51 | 2.3 | — | 5.5 |
| E11 | AF 52 | 9 | — | 18 |
| E12 | AF 53 | 12 | — | 12 |
| E13 | AF 54 | 7 | — | 14 |
| E14 | AF 55 | 13 | — | 13 |
| E15 | AF 56 | 26 | — | 14 |
| E16 | AF 57 | 47 | — | 5 |
| E17 | AF 58 | 520 | — | 21 |
| E18 | AF 59 | 236 | — | 2.2 |
| E19 | AF 60 | 378 | — | 2.6 |
| E20 | AF 61 | 358 | — | 19 |
| E21 | AF 62 | 152 | — | — |
| E22 | AF 63 | 191 | — | — |
| E23 | AF 64 | 436 | — | — |
| E24 | AF 65 | 1.4 | 57 | 43 |
| E25 | AF 66 | 1.1 | 86 | 42 |
| E26 | AF 67 | 1.6 | 86 | 25 |
| E27 | AF 68 | 2.0 | 9 | 23 |
| E28 | AF 69 | 3.2 | 220 | 21 |

EXAMPLE 9

This example illustrates the use of an alternative hydrocarbon carrier oil, in this case, an alkyl benzene. Thus, an antifoam composition was prepared by the methods of Example 1 containing 2.5% organo-silicone surfactant (as used in Example 3), 6.0% Tullenox 500 silica, 20% $MD_{100}D'_{17.5}M$ ($C_{18}H_{37}$) and 71.5% undecyl benzene. This antifoam had an efficiency of 2.6 in 0.5% SDS when tested by the Antifoam Performance methods set forth above. The relatively lower efficiency of this composition than many of the preferred mineral oil based antifoams is probably related to its lower viscosity.

EXAMPLE 10

An antifoam composition very similar to the composition of Example 9 was prepared. However, in this case, the alkylbenzene was replaced by a 1:1 mixture of kerosene and a high molecular weight polyisobutylene polymer. Such polymers are well known to be useful thickeners or "viscosifiers" for hydrocarbon oils and are used as such. The resulting antifoam had an efficiency of 21 in 0.5% SDS when tested by the Antifoam Performance methods set forth above.

A similar antifoam in which kerosene alone was used as the oil carrier had an efficiency of 1.6 when testing under the same conditions.

EXAMPLE 11

The performance of several commercial antifoams tested by the Antifoam Performance methods set forth above are recorded in Table 14. On comparing these results with those already given, it is seen that the novel compositions disclosed herein are generally superior to currently available hydrocarbon oil based antifoams and compare favorably with premium quality silicone based antifoams.

TABLE 14

| Commercial Antifoam | General Type | Use Level (ppm) | Antifoam Efficiency, in | | |
|---|---|---|---|---|---|
| | | | 0.5% SDS | 0.5% 15-S-9 | 10% FF |
| C1 | Self-dispersible hydrocarbon oil based antifoam | 500 | 1.6 | — | 5.1 |

TABLE 14-continued

| Commercial Antifoam | General Type | Use Level (ppm) | Antifoam Efficiency, in | | |
|---|---|---|---|---|---|
| | | | 0.5% SDS | 0.5% 15-S-9 | 10% FF |
| C2 | Self-dispersible hydrocarbon oil based antifoam | 500 | 1.6 | — | 9.3 |
| C3 | Filled silicone oil used in self-dispersible form | 500 | 3.8 | 500 | — |
| C4 | Silicone antifoam emulsion | 200 | 2.1 | 500 | 500 |

We claim:

1. A novel hydrocarbon oil based silicone antifoam composition comprising:
(a) from 1 to 60 weight percent of a hydrocarbon-silicon copolymer with a percent $CH_2$ content in the range of from 30% to 70% inclusive, which hydrocarbon-silicon copolymer is soluble in a hydrocarbon carrier oil and is selected from the group consisting of
(1) random or block copolymers of the general formula:

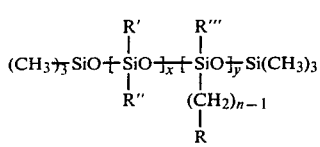

(2) non-hydrolyzable ABA block copolymers of the general formula:

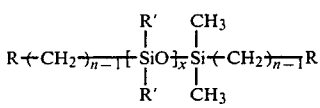

(3) hydrolyzable ABA block copolymers of the general formula:

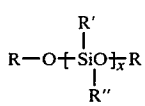

(4) non-hydrolyzable $AB_z$ block copolymers of the general formula:

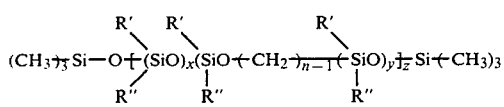

and
(5) hydrolyzable $AB_z$ block copolymers of the general formula:

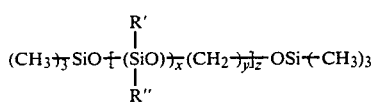

wherein R is an alkyl, aryl, aralkyl or alkaryl group containing from six to thirty carbon atoms, R', R" and R''' are individually selected from the group consisting of hydrogen or methyl, ethyl, propyl, hydroxy, and phenyl groups provided that no more than 5% of the total R', R" and R''' groups are hydrogen hydroxy, phenyl or a combination thereof, and x,y,z and n are such a value so that the overall % $CH_2$ content is in the range of from 30% and 70%

(b) from 1 to 20 weight percent of an hydrophobic filler having a particle size on the average of 200 to 5,000 A;

(c) from 0 to 25 weight percent of a organo-silicone surfactant of the general formula:

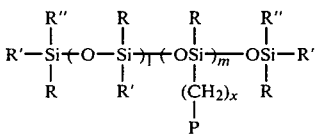

wherein R, R' and R" are individually alkyl groups having from 1 to 18 carbon atoms inclusive, or hydrogen, hydroxy or phenyl groups provided that no more than 5% of the total R, R' and R" groups are hydrogen, hydroxy, phenyl or a combination thereof. P is either a polyoxyethylene group, a polyoxypropylene group, a polyoxybutylene group or a mixture thereof which can be terminated with either an alkyl or hydroxyl group, l and m are such that the surfactant is liquid, has limited solubility and an HLB of from 4–14; and x has a value of from 2 to 5

(d) from 20 to 98 weight percent of a hydrocarbon carrier oil; and (e) optionally from 0 to 20 weight percent of a silicone oil.

2. The antifoam composition of claim 1 wherein the hydrocarbon-silicone copolymer has a %$CH_2$ in the range of from 45% to 65%.

3. The antifoam composition of claim 1 wherein the hydrocarbon-silicone copolymer proportion is between 5% to 20% by weight.

4. The antifoam composition of claim 1 wherein the hydrophobic filler is selected from the group consisting of alumina, titania, silica, pearlite and clay.

5. The antifoam composition of claim 5 wherein the hydrophobic filler is silica.

6. The antifoam composition of claim 1 wherein the hydrophobic filler proportion is between 2.5 to 7% by weight.

7. The antifoam composition of claim 1 wherein the silicone surfactant has an HLB of between 8 to 11.

8. The antifoam composition of claim 1 wherein the silicone surfactant proportion is between 0.5 to 10% by weight.

9. The antifoam composition of claim 1 wherein the hydrocarbon carrier oil has a viscosity of 15 to 70 CST at the temperature for which the antifoam is used.

10. The antifoam composition of claim 11 wherein the hydrocarbon carrier oil has a viscosity of 25 to 60 CST at the temperature for which the antifoam is used.

11. The antifoam composition of claim 1 wherein the hydrocarbon carrier oil is a mineral oil.

12. The antifoam composition of claim 1 wherein up to 25 weight percent of the hydrocarbon carrier oil is replaced by polyisobutylene.

13. The antifoam composition of claim 1 wherein the silicone oil is a polyorganosiloxane with a viscosity of from 5 to 100,000 centistokes at 25° C.

14. The antifoam composition of claim 1 composition comprising:
   (a) from 5 to 20 weight percent of a hydrocarbon-silicon copolymer having a % CH$_2$ in the range of 45 to 65%;
   (b) from 2.5 to 7 weight percent of a hydrophobic silica having a particle size on the average of 200 to 5,000 A;
   (c) from 0.5 to 10 weight percent of a silicone surfactant having a HLB value of from 8 to 11; and
   (d) from 63 to 92 weight percent of a mineral oil having a viscosity of from 15 to 70 CST at the temperature for which the antifoam is used.

15. A process for preparing the antifoam composition of claim 1 wherein the components (a) through (e) are emulsified in water employing an emulsifier to obtain an emulsion which contains from 1 to 50% by weight of the antifoam composition.

16. The emulsion prepared according to the process of claim 15.

17. A process for defoaming a foamed solution wherein there is added to the foamed solution the antifoam composition of claim 1.

18. The process of claim 17 wherein the foamed solution contains ionic surfactants.

19. The process of claim 17 wherein the foamed solution contains nonionic surfactants.

* * * * *

UNITED STATES PATENT AND TRADEMARK OFFICE
CERTIFICATE OF CORRECTION

PATENT NO. : 4,514,319
DATED : April 30, 1985
INVENTOR(S) : Kulkarni, et al

It is certified that error appears in the above-identified patent and that said Letters Patent is hereby corrected as shown below:

Col. 1, line 39, change "other" to -- others --.

Col. 1, line 57, change "in" (2rd occurrence) to -- is --.

Col. 2, line 66, change "spreaking" to -- spreading --.

Col. 3, line 50, change "board" to -- broad --.

Col. 4, lines 26 through 32, change $$\text{"}(CH_3C)_3\text{-SiO-}[(\underset{\underset{R''}{|}}{\overset{\overset{R'}{|}}{Si}}O)_x(CH_2)_y]\text{-OSi-}(CH_3)_3\text{"} \text{ to}$$

$$-- (CH_3)_3\text{-SiO-}[(\underset{\underset{R''}{|}}{\overset{\overset{R'}{|}}{Si}}O)_x(CH_2)_y]\text{-OSi-}(CH_3)_3 --.$$

Col. 4, line 47, change "precipated" to -- precipitated --.

Col. 5, line 11, change "it" to -- It --.

Col. 7, line 27, change "composition" to -- compositions --.

Col. 8, line 35 under Table 2, third col. under Identity, change "M = $(CH_3)_3$-O" to -- M = $(CH_3)_3$-Si-O --.

Col. 8, line 36 under Table 2, third col. under Identity, change "D = $(CH_3)_2$-O" to -- D = $(CH_3)_2$Si-O --.

UNITED STATES PATENT AND TRADEMARK OFFICE
CERTIFICATE OF CORRECTION

PATENT NO. : 4,514,319

DATED : April 30, 1985

INVENTOR(S) : Kulkarni, et al

It is certified that error appears in the above-identified patent and that said Letters Patent is hereby corrected as shown below:

Col. 8, line 49, change "Ridgefield" to -- Richfield --.

Col. 10, line 49, change "copolymer" to -- copolymers --.

Col. 14, line 22, change "Ridgefield" to -- Richfield --.

Col. 14, line 37, change "Ridgefield" to -- Richfield --.

Col. 18, line 10, change "a" to -- an --.

Col. 19, line 1, change "of claim 1 composition" to -- of claim 1 --.

Signed and Sealed this

Twenty-fourth Day of September 1985

[SEAL]

Attest:

Attesting Officer

DONALD J. QUIGG

Commissioner of Patents and Trademarks—Designate